Oct. 14, 1969 R. R. SIMMONS 3,472,966
CONVERSATION INTERRUPTER
Filed Sept. 13, 1966 2 Sheets-Sheet 1
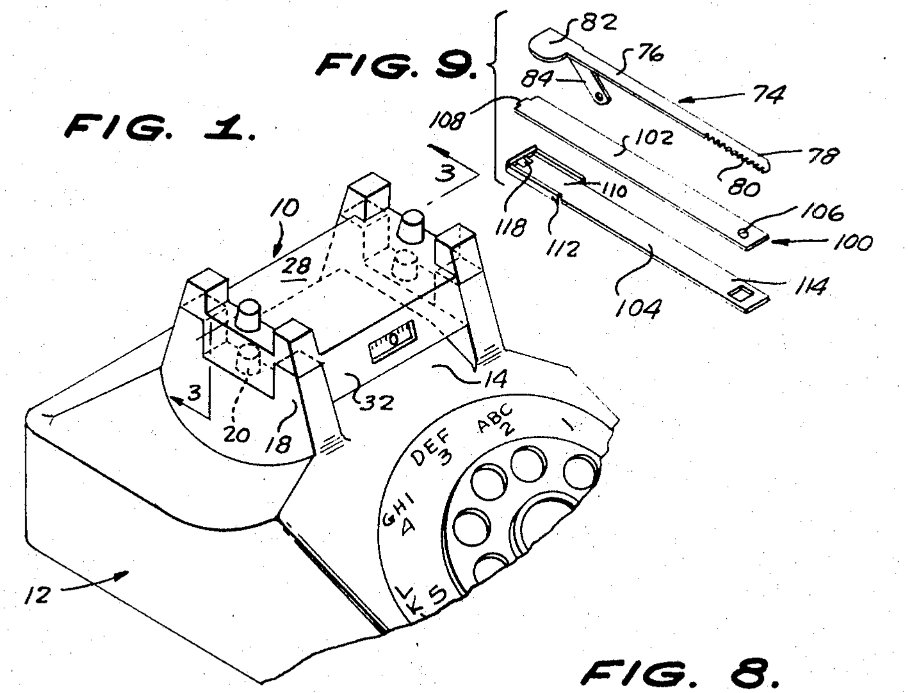
FIG. 9. FIG. 1.
FIG. 8.
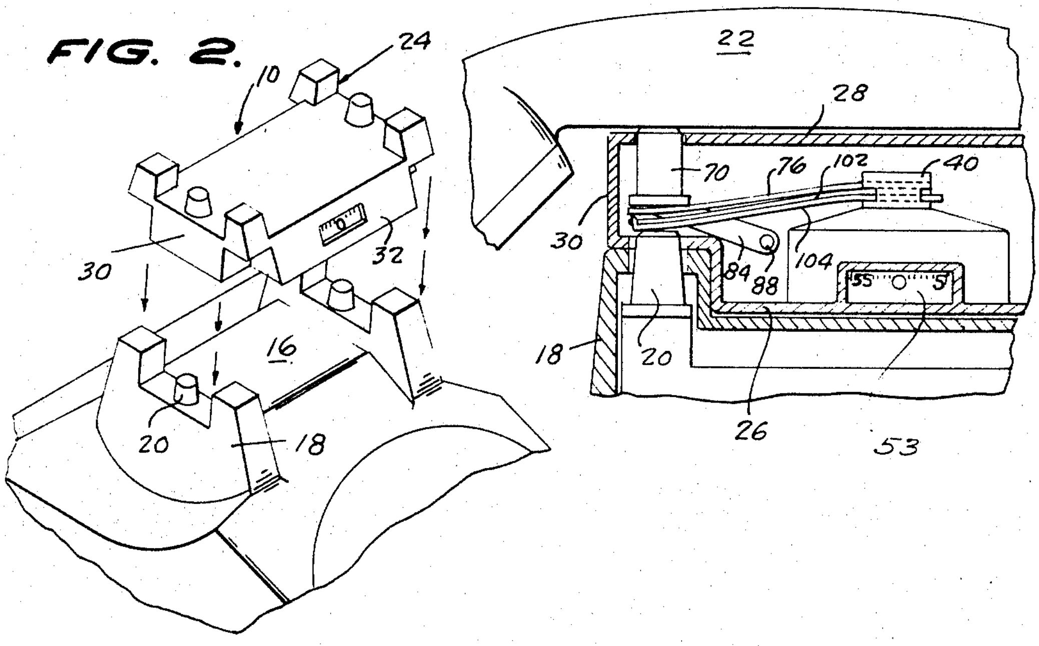
FIG. 2.
INVENTOR.
RYDEN R. SIMMONS
BY
Robert G. McMorrow
ATTORNEY.

Oct. 14, 1969 R. R. SIMMONS 3,472,966

CONVERSATION INTERRUPTER

Filed Sept. 13, 1966 2 Sheets-Sheet 2

INVENTOR.
RYDEN R. SIMMONS

BY

Robert G. McMorrow
ATTORNEY.

United States Patent Office 3,472,966

Patented Oct. 14, 1969

3,472,966

CONVERSATION INTERRUPTER

Ryden R. Simmons, 1342 Longfellow St., NW., Washington, D.C. 20011

Filed Sept. 13, 1966, Ser. No. 579,144
Int. Cl. H04m *11/00, 3/20*
U.S. Cl. 179—2 5 Claims

ABSTRACT OF THE DISCLOSURE

A telephone mounted timing device to interrupt a conversation at a selected interval following its institution is engaged on the telephone receiver and has a timing mechanism to break the telephone circuit by depression of the receiver switch.

This invention pertains to automatically reset timing devices, and to a device of that nature finding particular utility in the imposition of a preselected time limitation on the duration of a telephone conversation.

A basic objective of this invention resides in the provision of a timing assembly wherein the placement of a weighted object, such as a telephone unit, on a portion of the assembly effects a loading of a timing mechanism, and wherein removal of the unit activates the mechanism to complete a cycle of operation. A related object is to supply a means whereby an attachment to a telephone is effective to time the duration of a conversation beyond the control of the telephone user, to interrupt said conversation at the conclusion of a set time period, and to be reset for a next cycle of operation by the replacement of the telephone receiver on its cradle.

The invention contemplates the desirability, in some circumstances, of providing an attachment for a telephone which serves to automatically limit the duration of every conversation thereon. Contemplated areas of use would be certain business installations, telephones supplied for use in public places by a number of persons, those subject to use by children, and the like. To meet this objective, the present invention supplies a conversation interrupter having the characteristics of non-complex construction, ready attachability to telephones, and substantially automatic operation.

Other and further objects and advantages of the invention will become apparent to those skilled in the art from a consideration of the following specification when read in conjunction with the annexed drawings, in which:

FIGURE 1 is a perspective view showing a portion of a telephone set with apparatus constructed and assembled in accordance with the teachings of this invention in place thereon;

FIGURE 2 is a disassembled perspective view of the apparatus of FIGURE 1;

FIGURE 8 is a sectional view of the elements in another position of operation; and FIGURE 9 is a disassembled perspective view showing spring action components hereof.

Figures 3, 4, 5, 6, 7:
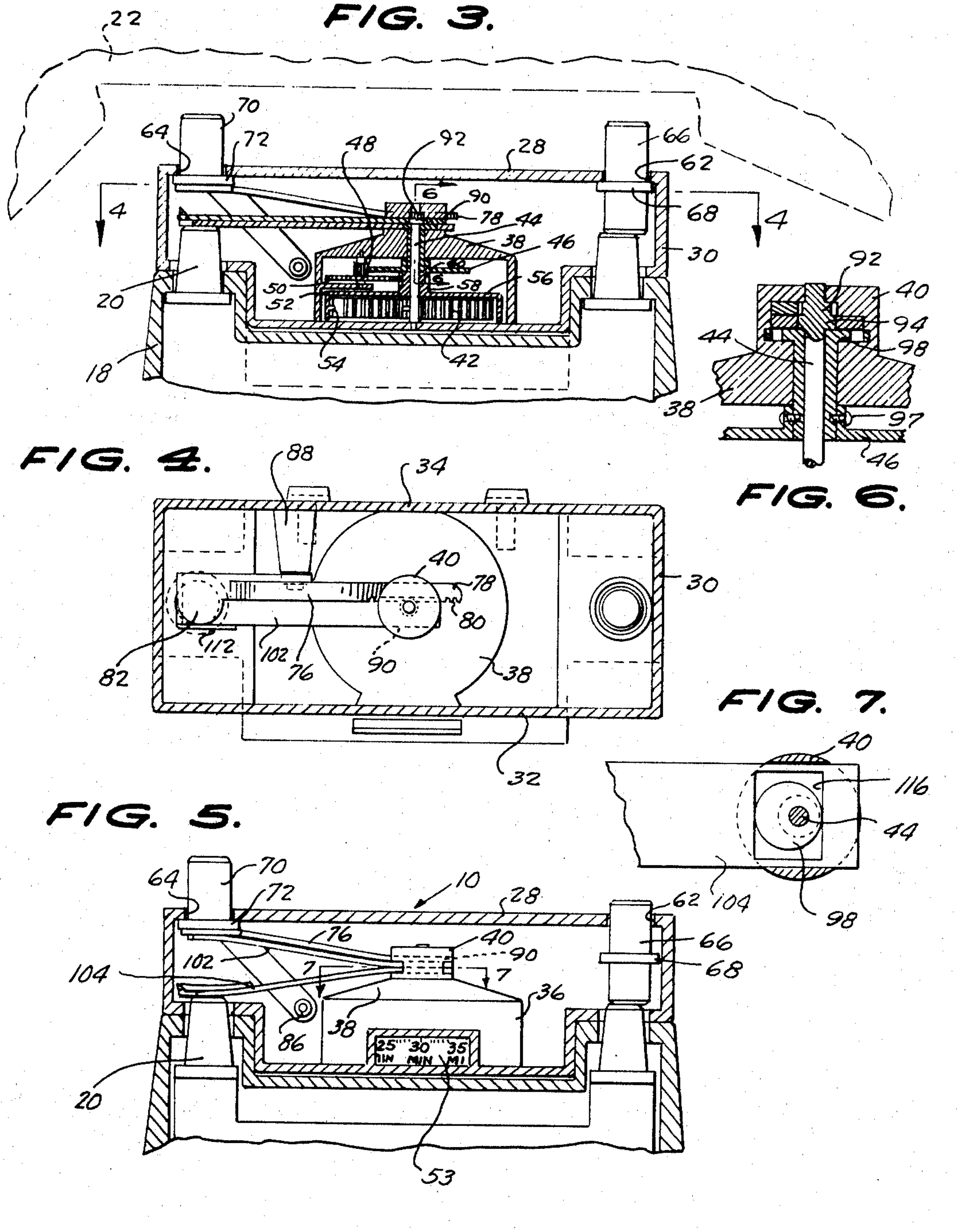
FIGURE 3 is an enlarged sectional view taken substantially on the section line 3—3 of FIGURE 1, looking in the direction of the arrows.
FIGURE 4 is a horizontal cross section taken substantially on the line 4—4 of FIGURE 3, looking in the direction of the arrows.
FIGURE 5 shows the elements in a given position of use.
FIGURE 6 is an enlarged, detail cross sectional view on the line 6—6 of FIGURE 3, looking in the direction of the arrows.
FIGURE 7 is another detail view, taken on the line 7—7 of FIGURE 5, looking in the direction of the arrows.

Referring to the drawings in more detail, a preferred form of timing device hereof is therein generally designated by reference numeral 10. In a typical environment of use, the device 10 is attached to a telephone set 12 which includes a cradle section 14 having a base 16 and indented sides 18. The sides have depressible lugs 20 extending upwardly in their indented portions which, in extended position, permit the telephone to be used, but when depressed, either from the weight of the head set 22 or otherwise, break the telephone circuit and thereby serve as switches therefor.

As indicated above, the purpose of the device 10 is to limit the duration of a telephone conversation by causing the circuit breaking switch 20 to be automatically depressed at a predetermined time following lifting of the receiver 22. It is further contemplated that the device be reset for subsequent cycles of operation by the replacement of the receiver thereon.

The device 10 comprises a housing 24 having a base wall 26, a top wall 28, sides 30 and a front and back 32, 34. As seen in the drawings, the housing is shaped to fit within the telephone cradle section 14 and to provide, in effect, a supplementary cradle for the receiver 22. Secured to the base wall 26 of the housing is an annular inner cover 36 having a top element 38 with an upstanding, central boss 40. Referring to FIGURE 3, it will therein be seen that a timing mechanism is mounted within the cover and includes a spring 42 secured at its inner end to an upstanding stem 44. An enlarged gear wheel 46 is fixed to the stem and is meshed with speed reduction control gears 48 and 50 mounted on a pedestal 52. A drum 53 carrying time indicia at spaced intervals is located about the spring, and the spring outer end is connected to the drum at 54. The drum has a roof section 56 with a spindle 58 journalled about the stem 44 and having outer gear teeth 60 meshed with the gear 50. Thus, upon the application of winding force to the spring and its release thereafter, the drum is rotated at a speed which is a function of the gear system and the extent of said rotation is reflected by the indicia on the drum in terms of remaining time. The employment of a gear and spring arrangement for this purpose herein is optional, and other and different timing mechanisms for the controlled movement of the indicia bearing element and for controlling a cycle of operation, may be employed.

The top wall 28 of the housing 24 has a pair of openings 62, 64 formed therein. A substantially cylindrical lug 66 extends outwardly through the opening 62 and has a central ring 68 thereabout of a diameter greater than that of the opening whereby the lug is maintained within the housing. The lug 66 is adapted to rest upon one of the said breaking switches 20 and to be held thereabove by the spring action of the latter, except when the receiver 22 is placed thereon, causing the lug 66 to depress the switch. An operating lug 70 is extended from the housing through the opening 64 thereof, and has a captive flange 72 disposed interiorly of the wall 28.

FIGURE 9 discloses, in disassembled form, three components of importance to the invention. A lever 74 is formed of spring-like metal or an equivalent material, and includes an elongated section 76 having a distal end 78 with a series of rack-type gear teeth 80 on one side thereof. The proximal end 82 of the lever 74 is employed to form a seat for the operating lug 70 thereagainst as seen in FIGURES 3, 5, and 8. An angular arm 84 is connected to the proximal end and the arm has an outer end portion 86 pivotally secured on an extension element 88 extending from the back wall 34 of the housing.

As shown in the drawing, the boss 40 of the inner cover 36 has a substantially horizontal slot 90 therethrough intermediate its ends, and in FIGURES 3 and 6, it will be observed that the distal end 78 of the lever 74 extends into said slot. The stem 44 has a toothed section at 92 comprising a pinion meshed with the rack-type gear of the lever. Hence, placement of the receiver 22 on the lug 70 thus depressing the lug is effective to move the lever horizontally and thereby rotate the stem to rewind the spring following termination of a conversation.

Referring to FIGURES 3 and 7, it will be noted that the stem has a concentric enlarged portion at 94. Immediately beneath the portion 94 a sleeve 96, forming a bearing for the interior cover, is secured to the stem by screw means 97, and has an eccentric flange 98 thereon forming a cam means.

A spring assembly 100, comprising a stationary upper leaf 102 and a movable lower leaf 104 is provided, the elements per se appearing in FIGURE 9. The leaf 102 has an opening 106 at its interior end. Said end extends into the slot 90 of the boss 40 and the opening admits the portion 94 of the stem therethrough, thereby causing the leaf 102 to be restrained from any lateral or horizontal movement. The leaf 102 has an extended lip 108 at its opposite end for a purpose appearing below.

The leaf 104 is elongated and includes an outer end section 110 with upright guide flange means 112 thereabout, and an opposite end 114. An enlarged, substantially rectangular opening 116 is formed in the end 114 as best shown in FIGURE 7, and the cam 98 is disposed therein. The leaf 104 is normally engaged by the leaf 102 during the running of a time cycle of the device 10, the leaf 104 having a slot 118 in its end 110 receiving the lip 108. The leaf 102 is adapted, by reason of its comparative resiliency and positioning, and with the spring tendency of the circuit switch 20, to bias the spring leaf 104 upwardly to the positon shown in FIGURE 3 during operation. Movement of the cam 98 by reason of completion of the time cycle, to the FIGURE 7 position thereof, forces the leaf 104 to move horizontally disengaging the slot 118 from the lip 108, whereupon the leaf 104 is released to depress the switch 20, thus terminating the telephone conversation.

It will be observed that the housing 24 is shown as being frictionally engaged upon the telephone cradle section 14. If desired, suitable locking means or permanent affixation may be readily effected by conventional fastening or locking devices. It is further contemplated that, if desired, audible signal means of conventional design may be included to warn the user of the impending termination of the time limit set, and changeable timing means for the cycle may also be included.

In a cycle of operation, placement of the receiver 22 on the lugs 66 and 70 effects a winding of the timing mechanism and the weight of the receiver holds the components in this set position. Removal of the receiver institutes the uncoiling of the spring 42, and rotation of the stem 44, remaining time indicia being constantly exposed to view. As cam 98 is rotated to an extent of travel sufficient such that the lip 108 is disengaged from the slot 118, the leaf 104 moves downwardly against the switch 20 to cause the same to be disengaged is reached, the switch 20 and the conversation interrupted until re-dialed.

Having described and illustrated an embodiment of this invention in some detail, it will be understood that this description and illustration have been offered only by way of example, and that the invention is to be limited in scope only by the appended claims.

What is claimed is:

1. A timing device adapted for use with a telephone set including a head set and a cradle therefor and having a circuit breaking switch associated with the cradle, comprising;

mounting means with a controlled timing mechanism therein, the mounting means comprising a housing operatively associated with the cradle;

means connected to said housing and positioned to contact the circuit breaking switch of the cradle comprising at least one depressible lug arranged to extend within said housing;

lever means for actuation of the timing mechanism pivotally secured on said housing and having a proximal end contacted by the depressible lug and having a distal portion, the lever means being reciprocally movable responsive to movement of the lug;

said timing mechanism including a stem having a cam portion thereon;

means interconnecting the switch and the timing mechanism, said means being disengaged responsive to the completion of a cycle of operation of the timing mechanism and comprising a pair of interconnected spring leaf elements engaged to one another during operation of the timing mechanism; and one of said leaf elements being connected to said cam portion whereby upon completion of operation of said timing mechanism the leaf elements are disengaged, one of said elements then contacting the circuit breaking switch of the telephone set.

2. A timing device as defined in claim 1, wherein:

said interconnected spring leaf elements are oppositively biased.

3. A timing device as defined in claim 1, wherein:

the timing mechanism includes a rewind stem; and the distal portion of the lever and said rewind stem have a rack and pinion gear connection.

4. A timing device as defined in claim 1, wherein:

the timing mechanism is spring driven.

5. A timing device as defined in claim 1, and:

indicia bearing means associated with the timing mechanism.

References Cited

UNITED STATES PATENTS 2,653,195 9/1953 Zimmerman --------- 179—178

KATHLEEN H. CLAFFY, Primary Examiner

J. S. BLACK, Assistant Examiner

U.S. Cl. X.R.

179—178